United States Patent
Ansari et al.

(10) Patent No.: US 12,124,323 B2
(45) Date of Patent: Oct. 22, 2024

(54) REGISTER INTEGRITY CHECK IN CONFIGURABLE DEVICES

(71) Applicant: XILINX, INC., San Jose, CA (US)

(72) Inventors: Ahmad R. Ansari, San Jose, CA (US); David P. Schultz, Seattle, WA (US); Felix Burton, Foster City, CA (US); Jeffrey Cuppett, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 74 days.

(21) Appl. No.: 17/883,379

(22) Filed: Aug. 8, 2022

(65) Prior Publication Data
US 2024/0045750 A1    Feb. 8, 2024

(51) Int. Cl.
*G06F 11/07* (2006.01)
*G06F 9/30* (2018.01)

(52) U.S. Cl.
CPC ...... *G06F 11/0763* (2013.01); *G06F 9/30101* (2013.01); *G06F 11/0772* (2013.01)

(58) Field of Classification Search
CPC . G06F 11/076; G06F 9/30101; G06F 11/0772
USPC .......................................................... 714/48
See application file for complete search history.

(56) References Cited

U.S. PATENT DOCUMENTS

2019/0050604 A1*    2/2019    Weber .................... G06F 21/76

* cited by examiner

*Primary Examiner* — Yair Leibovich
(74) *Attorney, Agent, or Firm* — Patterson + Sheridan, LLP

(57) ABSTRACT

Embodiments herein describe integrity check techniques that are efficient and flexible by using local registers in a segment to store check values which can be used to detect errors in the local configuration data in the same segment. In addition to containing local registers storing the check values, each segment can include a mask register indicated which of the configuration registers should be checked and which can be ignored. Further, the segments can include a next segment register indicating the next segment the check engine should evaluate for errors.

20 Claims, 6 Drawing Sheets

REGISTER INTEGRITY CHECK IN CONFIGURABLE DEVICES

TECHNICAL FIELD

Examples of the present disclosure generally relate to detecting errors in configuration data.

BACKGROUND

Configurable devices include configuration registers that store configuration data dictating how circuitry in the devices operate or function. The configuration registers are often checked regularly for integrity to ensure they have retained their correct values throughout the operation of the device. An inefficient but common mechanism to perform the integrity check is to read the registers using a processor and compare them against the original configuration image stored in memory. In addition to being inefficient, this requires retaining the image throughout the operation of the device.

SUMMARY

One embodiment describes a device that includes a plurality of segments, each segment including a plurality of configuration registers storing configuration data, a mask register indicating a subset of the plurality of configuration registers storing valid configuration data, and a check value register storing check values corresponding to the valid configuration data. The device also includes a check engine circuit coupled to the plurality of segments and configured to identify the valid configuration data in the plurality of configuration registers based on the mask register and compare check values generated from the valid configuration data to the check values stored in the check value register to determine whether the valid configuration data has been corrupted.

Another embodiment described herein is an integrated circuit that includes a segment that includes a plurality of configuration registers storing configuration data, a mask register indicating a subset of the plurality of configuration registers storing valid configuration data, and a check value register storing check values corresponding to the valid configuration data. The integrated circuit also includes a check engine circuit coupled to the plurality of segments and configured to identify the valid configuration data in the plurality of configuration registers based on the mask register and compare check values generated from the valid configuration data to the check values stored in the check value register to determine whether the valid configuration data has been corrupted.

Another embodiment described herein is a method that includes receiving check values from a local check value register in a segment, wherein the segment further comprises a plurality of configuration registers and a mask register, identifying which of the plurality of configuration registers should be checked for errors based on a bit mask in the mask register, and performing an integrity check on the identified configuration registers based on the check values.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
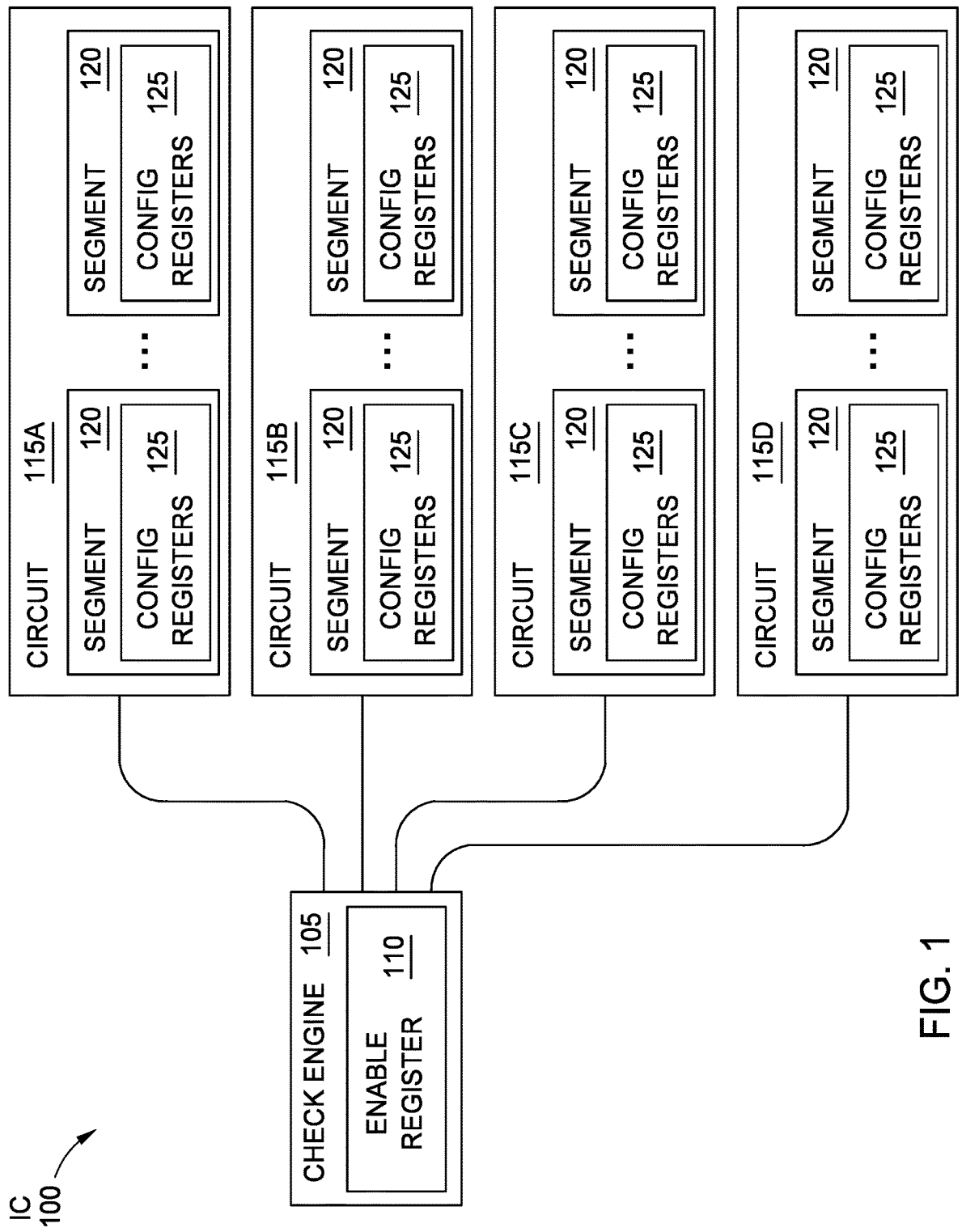
FIG. 1 illustrates a system for detecting errors in configuration data in an integrated circuit, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe integrity check techniques that are efficient and flexible by using local registers to store check values (e.g., error correction codes (ECC), cyclic redundancy check (CRC) values, or other hash values) which can be used to detect errors in the local configuration data. However, the addresses of the configuration registers storing the configuration data are not necessarily contiguous which makes it difficult to stream the register efficiently through the error check function to detect an error.

In one embodiment, the integrity check is performed on segments of configuration registers (e.g., register groups) with the information to guide the computation being stored in dedicated registers within the segment. For example, in addition to containing local registers storing the check values, each segment can include a mask register indicated which of the configuration registers in the segment should be checked and which can be ignored. For example, the registers that are skipped or ignored may be status or control registers that are dynamically updated during the operation of the circuit and do not contain fixed, predictable values. Further, the segments can include a next segment register indicating the next segment the check engine should evaluate for errors. The next segment register can inform the check engine how many of the segments should be skipped. In this way, the configuration data does not have to be stored in continuous configuration registers. In this manner, the integrity check has improved flexibility to skip registers within a segment, as well as entire segments, in addition to improved efficiency since the check engine does not need to store the entire configuration image but can instead rely on the local check values stored in each segment.

FIG. 1 illustrates a system for detecting errors in configuration data in an integrated circuit (IC) 100, according to an embodiment. The IC 100 includes a check engine 105 which is a hardware component (e.g., check engine circuitry) that performs integrity checks on the configuration data stored in the configuration (config) registers 125 in the circuits 115A-1150. The circuits 115 can be the same type of circuit (e.g., transceivers) or can be different types of circuits (e.g., a mix of transceivers, power controllers, memory controllers, bridges, programmable logic, data processing engines, etc.). While four circuits are shown, the check engine 105 can perform integrity check on any number of circuits 115. Further, in one embodiment, the IC 100 may include multiple check engines 105 distributed throughout the IC 100. Each of the check engines may be assigned to perform integrity checks on circuits in assigned regions. That way, the check engines can operate in parallel to perform integrity checks.

The IC 100 can be an application specific integrated circuit (ASIC), field programmable gate array (FPGA), system on a chip (SoC), chiplet, anchor die, and the like. In other embodiments, the check engine 105 and the circuits 115 may be on different ICs. For example, a device may include a plurality of ICs where the check engine 105 is disposed on one IC along with one or more of the circuits 115 while some of the other circuits 115 are disposed on a second (or third) IC.

Some of the circuits 115 may not currently be configured. For example, the circuit 115A may perform a function that the user is not currently using. Thus, the config registers 125 in the circuit 115A may not contain data that needs to be checked. The check engine 105 includes an enable register 110 that can include mask bits to indicate which of the circuits 115 the check engine 105 should perform the integrity check on. In this example, the enable register 110 can include a mask bit indicating the check engine 105 does not need to check the config registers 125 in the circuit 115A but does for the circuits 115B-D.

Each circuit 115 can include multiple segments 120 which in turn have their own config registers 125. That is, each circuit 115 can have one, two, three, four, etc. segments 120. In one embodiment, each of the segments 120 have the same number of registers (e.g., 32 registers), however, different circuits 115 can have different number of segments 120. For example, the circuit 115A may have two segments 120 while the circuits 115B and 115C each have four segments 120 and the circuit 115D only has one segment 120. Alternatively, the circuits 115 can each have the same number of segments 120.

In one embodiment, the circuits 115 are assigned one or more apertures (e.g., a fixed size window in the memory address space) and have their own address space. The address space of the segments 120 may be respective portions of the address space for the circuits 115. Further, to increase flexibility, the segments 120 may include registers for storing data indicating which of the config registers 125 in the segment should be checked by the check engine 105. In addition, the segments 120 can include registers for indicating the next segment the check engine 105 should check. That way, the check engine 105 can skip segments 120 that are currently unused.

Figure 2:
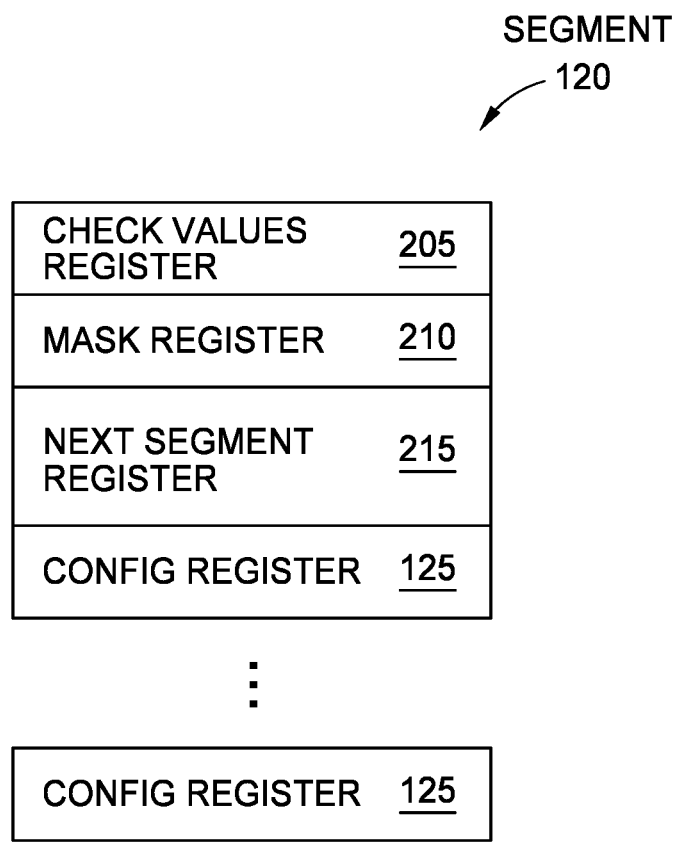
FIG. 2 illustrates a segment of registers containing configuration data, according to an embodiment.

FIG. 2 illustrates a segment 120 of registers containing configuration data, according to an embodiment. In this example, the segment 120 includes a check values register 205 which stores the check values (e.g., ECG, CRC values, hash values, and the like) that can be used to detect errors in the configuration data in the config registers 125. For example, when performing an integrity check on the segment, the check engine (e.g., the check engine 105 in FIG. 1) can retrieve the configuration data in the config registers 125, run the configuration data through a hashing function to result in check values, and determine whether those check values match the check values stored in the local check values registers 205. If so, the configuration data does not have any errors. In contrast, if the check values generated by the check engine do not match the check values from the local check values register 205, the check engine knows there is an error in the configuration data stored in the config registers 125 caused by, for example, a bit flip from cosmic rays or background radiation.

In the case of error, an error interrupt/flag can be generated with the address of the registers that have error stored. This allows a processor/manager to correct the contents of the registers using the expected ECC value if there is a single error. On the other hand if there is more than one bit flipped and the registers cannot be corrected, a fatal error may be generated.

The segment 120 also includes a mask register 210 for identifying config registers 125 that do not store valid configuration data. In some embodiments, the configuration data may be stored in different config registers 125 since each config register may map to different circuitry. Since some circuitry may be used while other circuitry is not, only some of the config registers 125 may store configuration data at any given time. Moreover, because of the mapping between the config registers 125 and the circuit being configured, the config registers 125 that store valid configuration data may not be contiguous. For example, assuming the segment 120 include ten config registers 125, the first four may store registers 125 may store valid configuration data, the next two registers 125 may not store valid configuration data, and the last four registers 125 may store valid configuration data.

The mask register 210 can store mask bits indicating which of the config registers 125 in that segment 120 include valid data. When performing the integrity check, the check engine can first evaluate the mask register 210 to identify the config registers 125 that need to be checked, and use a zero value when processing the config registers 125 that do not need to be checked. In this manner, the config registers 125 do not have to all store valid configuration data. Further, each segment 120 can include its own local mask register 210 so that the check engine does not need to track which config registers 125 in each segment 120 store valid or invalid configuration data.

The segment 120 also includes a next segment register 215 that indicates the next segment 120 that needs to be checked by the check engine. That is, the check engine can read the data in the next segment register 215 to locate the next segment that needs to be checked. As discussed above, not every segment 120 may store valid configuration data. In one embodiment, the next segment register 215 can indicate the number of segments the check engine should skip in order to reach the next segment storing configuration data that should be checked. For example, the check engine may raster through the segments in order (according to an address space). If the value in the next segment registers 215 is zero, then the check engine moves to the next address in the address space which happens to be the next segment. However, if the value in the segment register 215 indicates that two segments should be skipped, then the check engine skips two segments and then begins the integrity check on the third segment. The third segment can include its own next segment register 215 which indicates the next segment to be checked. In this manner, the check engine can raster through the address space of all the segments where the local next segment registers 215 in each of the segment 120 inform the check engine whether it should proceed to the next sequential segment or skip one or more sequential segments in the address space.

In one embodiment, the next segment register 215 may store an address of the next segment the check engine should perform the integrity check. In another embodiment, the segments 120 may have the same memory size, thus, the next segment registers 215 can simply indicate a number of segments 120 to skip and then, based on the uniform segment size, the check engine can skip those segments.

Figure 3:
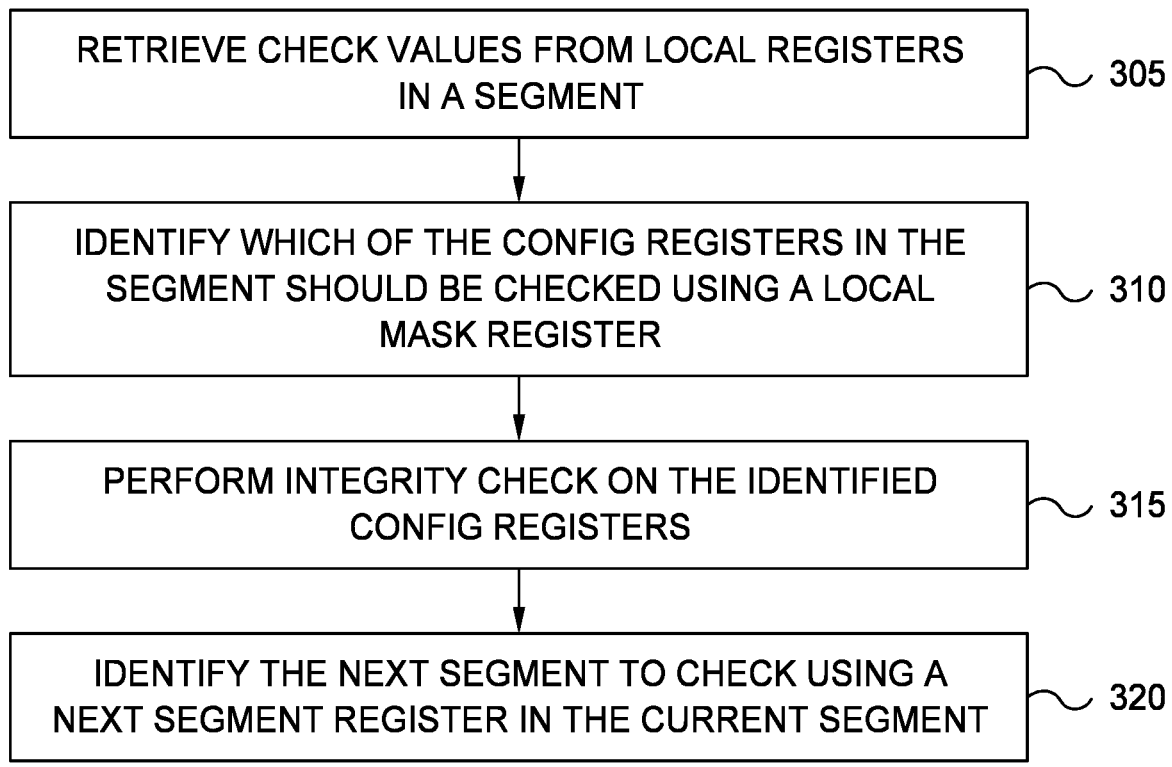
FIG. 3 is a flowchart for detecting errors in configuration data in a segment, according to an embodiment.

FIG. 3 is a flowchart of a method 300 for detecting errors in configuration data in a segment, according to an embodiment. Although not discussed in the method 300, the check engine may use a register (e.g., the enable register 110 in FIG. 1) to identify an aperture or circuit to perform an integrity check. The register can indicate which aperture or circuit has segments that store configuration data on which the integrity check should be performed.

At block 305, the check engine retrieves check values from local registers in a segment. As discussed above, the config registers may be divided into multiple segments (e.g., the segments 120 in FIG. 1) which include additional registers for storing check values (e.g., ECC data, CRC data, hash values, and the like). The check values were previously computed by the host which provided the configuration image check engine (or by the check engine) and stored in the check value registers in each segment. The check values serve as a "truth" that can be compared against the current configuration data stored in the segment.

In one embodiment, the segment can include additional check values for ensuring the check values themselves have not been corrupted. That is, the check engine may use the additional check values to first ensure the check values that will be used to verify the configuration data have not been corrupted.

At block 310, the check engine identifies which of the config registers in the segment should be checked using a local mask register. The local mask register can store a bit map indicating which of the config registers store valid and invalid (or null) configuration data. The check engine can use the bit mask to determine which of the config registers have valid configuration data and which do not. For the config registers in the segment that do not store valid configuration data, the check engine can use a zero value or some other fixed value for those registers when generating check values. Or the check engine may ignore or skip the config registers that store invalid data.

At block 315, the check engine performs an integrity check on the identified config registers. In one embodiment, the check engine retrieves the configuration data stored in the identified config registers and performs a function (e.g., a hashing function, determines a modulus, etc.) to generate check values for the configuration data. These check values can then be compared to the check values in the location registers that was retrieved at block 305. If the check values match the locally stored check values, this indicates the configuration data in the config registers has not been corrupted. If the check values do not match, this indicates at least one bit in the configuration data has become corrupted.

In one embodiment, the check values permit the check engine to perform error correction when an error is detected. For example, the check values may be ECC values which permits the check engine to correct, as well as detect, corrupted configuration data in the config registers.

At block 320, the check engine identifies the next segment to check using a next segment register in the current segment. The next segment register can store an address, a number of segments to skip, a pointer, a block of memory to skip, and the like. For example, if the segments are all the same size, indicating the number of segments to skip may be sufficient. However, if the segments can be different sizes, the next segment register may have an address of, or pointer to, the next segment.

If the segment is the last segment in an aperture or circuit, the mask register (or alternatively the next segment register) can store a special code indicating the check engine has evaluated all the valid segments in the aperture or circuit.

The method 300 may repeat at the next segment. In this manner, the check engine may progress through all the segments that have valid configuration data in a particular circuit or aperture to ensure the configuration data has not been irrupted. Moreover, in some embodiments, the check engine may be able to correct errors using the check values. However, in other embodiments, the check engine may flag software (e.g., an operating system) when an error is detected and the software may correct the error.

Figure 4:
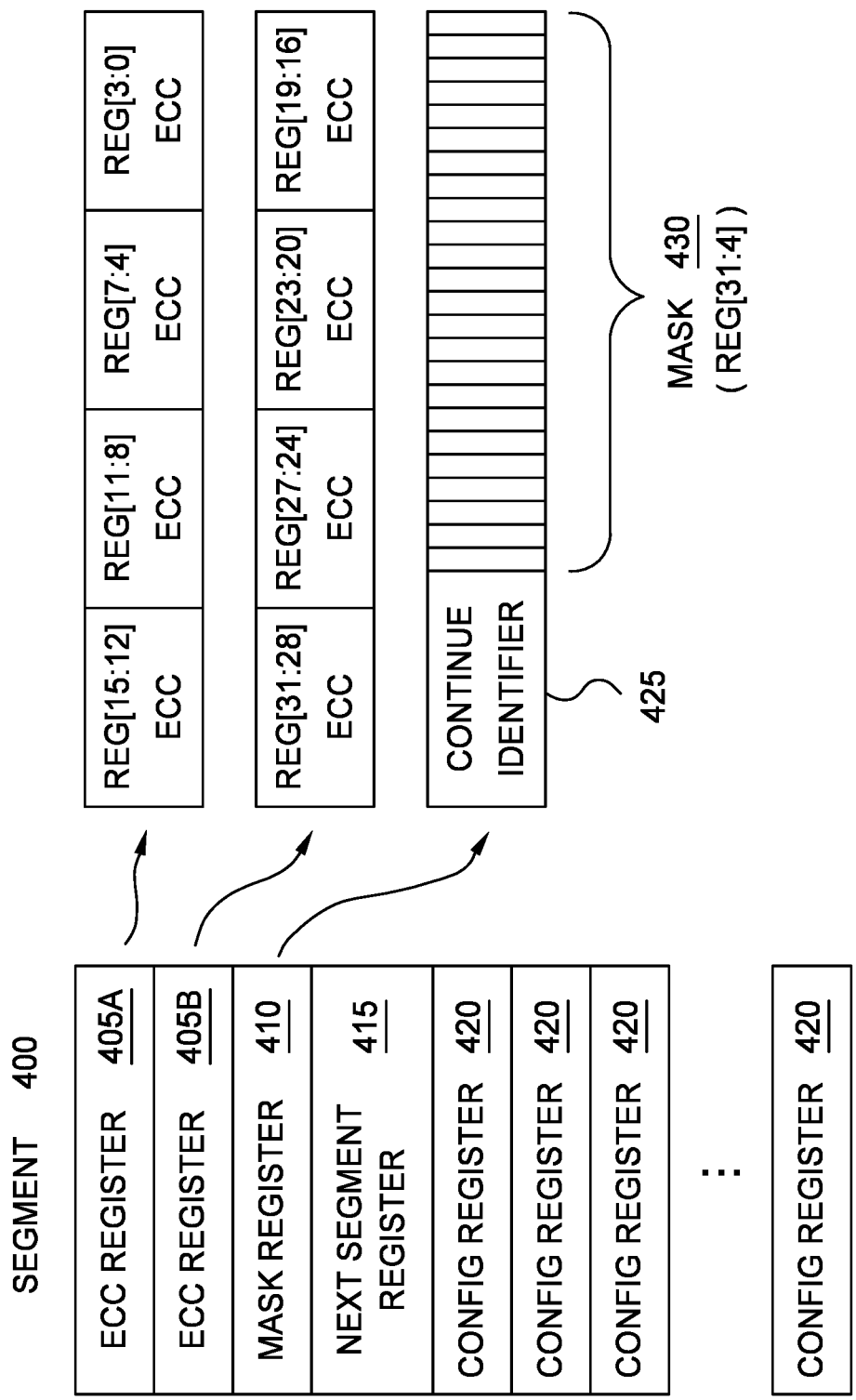
FIG. 4 illustrates a segment of registers containing configuration data, according to an embodiment.

FIG. 4 illustrates a segment 400 of registers containing configuration data, according to an embodiment. The segment 400 is one example of a suitable segment 120. The segment 400 uses ECC values as the check values, which are stored in ECC registers 405A and 405B. While this example uses two ECC registers 405, other implementations may use only one ECC register 405, or use more than two ECC registers 405.

The right side of FIG. 4 illustrates that each ECC register 405 is divided into four portions that store ECC values for the registers in the segment 400 (e.g., 32 registers in this implementation). For example, the ECC register 405A stores ECC values for registers 0-15 while the ECC register 405B stores ECC values for registers 16-31. The ECC values for the registers 0-3 can be used to ensure the data in the ECC registers 405, a mask register 410, and a next segment register 415 has not been corrupted. That is, segment 400 can include check values for performing an integrity check on the data in these four register in the segment 400. The ECC values of the registers 4-31 are used to perform integrity check on the 28 config registers 420 in the segment. As such, the segment 400 has 32 registers total. In this example, the two ECC registers 405 store ECC values for all 32 registers within the segment 400. But again, this is just one example of a segment 400. For instance, the segment 400 may have fewer total registers in which case only one ECC register 405 may be used, or the segment 400 may have more than 32 registers in which case the segment 400 may have additional ECC registers 405.

The mask register 410 is one example of the mask register 210 in FIG. 2. The details of the mask registers 410 is shown on the right of FIG. 4 where a first portion of the register 410 is used to provide a continue identifier 425 and the remaining portion of the register 410 provides a mask 430. The continue identifier 425 indicates whether the segment 400 is the last segment for a particular aperture or circuit. For example, if the continue identifier 425 includes the value "0000", then the check engine knows the segment 400 is the last segment in the aperture. If not, then the check engine knows there is another segment in the aperture that should be checked for errors.

The mask 430 is a bit mask for the config registers 420 (e.g., the registers 4-31). The mask 430 indicates which of the config registers 420 store valid configuration data and which of the registers 420 can be ignored when generating the check values as discussed in the method 300.

The next segment register 415 indicates whether the check engine should check the next sequential segment in the address space, or should skip one or more segments. The next segment register 415 can store an address, a number of segments to skip, a pointer, a block of memory to skip, and the like. Thus, when finished performing the integrity check for the config registers 420 in the current segment 400, the check engine can use the information stored in the next segment register 415 to move on to the next segment that should be checked.

Figure 5:
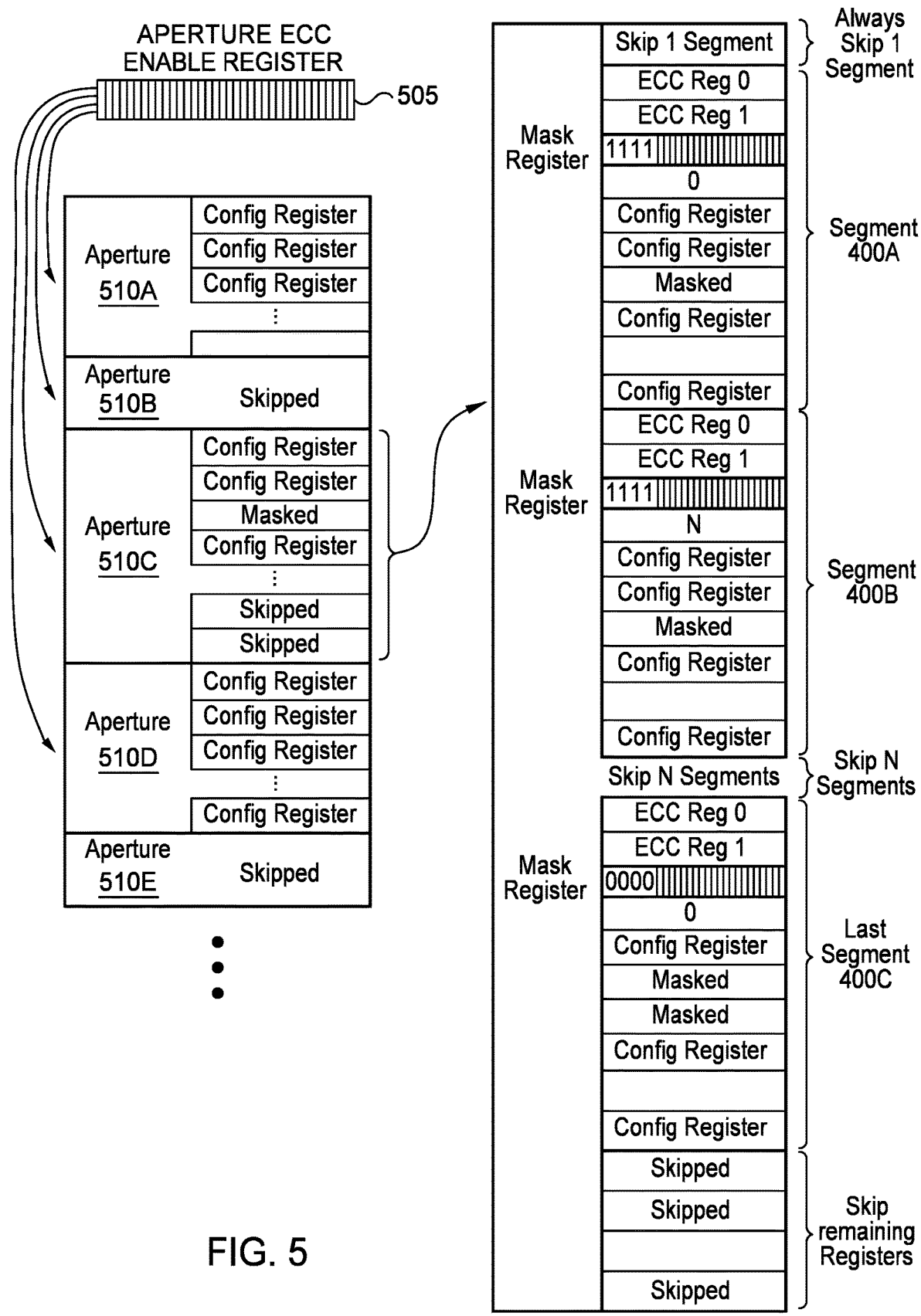
FIG. 5 illustrates segments for different circuits in an integrated circuit, according to an embodiment.

FIG. 5 illustrates segments for different circuits in an integrated circuit, according to an embodiment. In FIG. 5, the different circuits are referred to as apertures 510 which each can include any number of segments 400. In this example, the check engine includes an Aperture Enable Register 505 which is one implementation of the enable register 110 in FIG. 1. The Aperture Enable Register 505 indicates which of the apertures 510 the check engine should perform an integrity check on. That is, each time the check engine is instructed to perform an integrity check, the engine can refer to the Aperture Enable Register 505 to identify which of the apertures 510 should be checked and which can be ignored.

In FIG. 5, the apertures 510A, 510C, and 510D store configuration data that should be checked for errors while the apertures 510B and 510E do not. The Aperture Enable Register 505 can include a bit mask that indicates the apertures 510A, 510C, and 510D should be checked during the integrity check while the apertures 510B and 510E can be skipped.

The right side of FIG. 5 illustrates the details of aperture 510C. In this example, the aperture 510C includes multiple segments 400 where some include valid configuration data while others do not. In this example, the first segment in each aperture is skipped. For example, each aperture may have a segment with registers that are never integrity checked. These segments can be put first in the aperture and the check engine can be programmed to always skip the first segments. However, if the aperture does not include registers that are never checked for errors, then the check engine may start at the first segment rather than skipping it.

The segment 400A has the same format as the segment 400 in FIG. 4 where the first two registers store the ECC values for the 32 registers in the segment 400A. The third register is a mask register that indicates in the continuation identifier that the segment 400A is not the last segment in the aperture 510C and a bit mask indicating which config registers in the segment 400A store valid configuration data. The fourth register is a next segment register that has a value of "0" indicating that the next sequential segment—i.e., segment 400B— should be checked once the check engine has finished performing the integrity check on the segment 400A.

Moreover, one of the config registers in the segment 400A is marked as "Masked" indicating that it was masked by the bit mask in the third register in the segment 400A.

The segment 400B is similar to segment 400A except its fourth register—i.e., the next mask register—indicates the check engine should skip N number of segments after it has completed the integrity check for the segment 400B. Thus, FIG. 5 illustrates the check engine skips N segments before reaching the segment 400C where it will again perform an integrity check.

The third register in the segment 400C (i.e., the mask register) has a continuation identifier indicating it is the last segment in the aperture on which the integrity check should be performed. Although the segment 400C is not the last physical segment in the aperture 510C, the remaining segments do not have valid configuration data. As such, as pertaining to performing integrity checks, the segment 400C is the last in the aperture 510C on which an integrity check should be performed. As such, the remaining segments in the aperture 510C are skipped by the check engine. In one embodiment, the engine always skip a fixed number of segments at the beginning of an aperture. For example, in FIG. 5, the first segment is always skipped.

Figure 6:
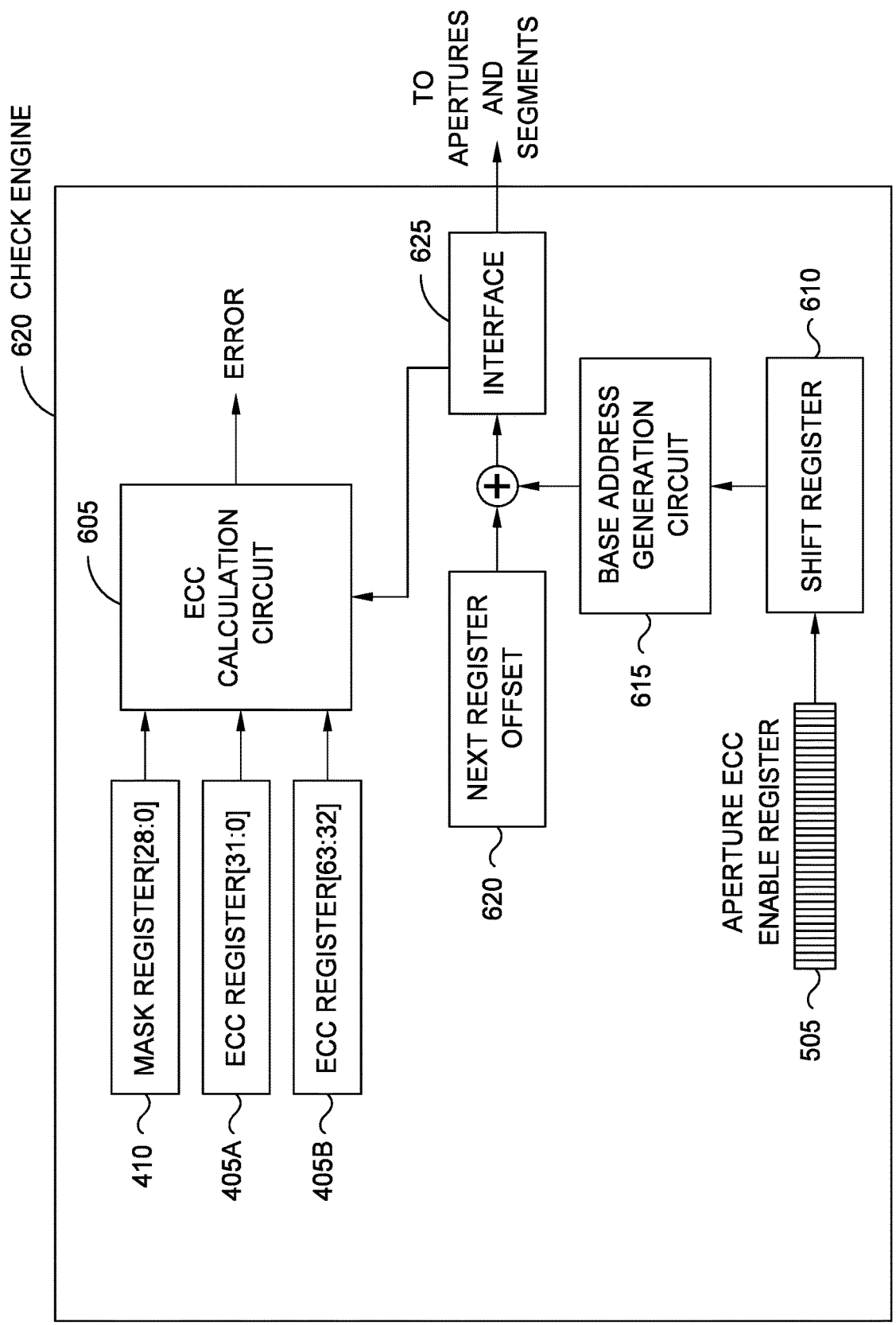
FIG. 6 illustrates a check engine, according to an embodiment.

FIG. 6 illustrates a check engine 600, according to an embodiment. The check engine 600 is one exemplary implementation of the check engine 105 in FIG. 1, The check engine 600 includes an ECC calculation circuit 605 that receives as input the information stored in a segment's mask register 410 and ECC registers 405A and 405B. The ECC calculation circuit 605 is coupled to an interface 625 which can retrieve this information, as well as the configuration data, stored in the segments. As discussed in the method 300, the ECC calculation circuit 605 can then perform an ECC calculation on the configuration data and determine whether it matches the ECC values stored in the ECC registers 405A and 405B. If not, the ECC calculation circuit 605 can output an error indicating the configuration data is corrupted.

The check engine 600 also includes a shift register 610, base address generation circuit 615, and a next register offset value 620 which are used to parse through the apertures and the segments within each apertures. That is, these circuits can use the Aperture Enable Register 505 to identify which apertures or circuits should be checked for errors and parse the segments within those apertures.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A device, comprising:
 a plurality of segments, each segment comprising:
  a plurality of configuration registers storing configuration data;
  a mask register indicating a subset of the plurality of configuration registers storing valid configuration data; and
  a check value register storing check values corresponding to the valid configuration data; and
 a check engine circuit coupled to the plurality of segments and configured to:
  identify the valid configuration data in the plurality of configuration registers based on the mask register; and
  compare check values generated from the valid configuration data to the check values stored in the check value register to determine whether the valid configuration data has been corrupted.

2. The device of claim 1, wherein each of the plurality of segments comprises:
 a next segment register indicating a next segment of the plurality of segments that should be checked for errors once a current segment has been checked, wherein the check engine circuit is configured to identify a number of sequential segments of the plurality of segments to skip using the next segment register.

3. The device of claim 1, wherein the mask register comprises an identifier indicating whether a segment is a last segment.

4. The device of claim 1, further comprising:
a plurality of circuits, each of the plurality of circuits comprising a different set of the plurality of segments,
wherein the check engine circuit comprises an enable register indicating a subset of the different sets of the plurality of segments that should be checked for errors.

5. The device of claim 1, wherein the check engine circuit and the plurality of segments are disposed on a same integrated circuit.

6. The device of claim 1, wherein the check value register stores first check values corresponding to other check values stored in the check value register and data in the mask register,
wherein the check engine circuit is configured to use the first check values to determine whether the other check values stored in the check value register and the data in the mask register have become corrupted.

7. The device of claim 6, wherein each of the plurality of segments includes a plurality of check value registers, wherein a first register of the plurality of check value registers stores the first check values and a second register of the plurality of check value registers stores check values only corresponding to the valid configuration data.

8. An integrated circuit, comprising:
a segment, comprising:
a plurality of configuration registers storing configuration data;
a mask register indicating a subset of the plurality of configuration registers storing valid configuration data; and
a check value register storing check values corresponding to the valid configuration data; and
a check engine circuit coupled to the segment and configured to:
identify the valid configuration data in the plurality of configuration registers based on the mask register; and
compare check values generated from the valid configuration data to the check values stored in the check value register to determine whether the valid configuration data has been corrupted.

9. The integrated circuit of claim 8, wherein the segment comprises:
a next segment register indicating a next segment that should be checked for errors once the segment has been checked,
wherein the check engine circuit is configured to identify a number of sequential segments to skip using the next segment register.

10. The integrated circuit of claim 8, wherein the mask register comprises an identifier indicating whether the segment is a last segment.

11. The integrated circuit of claim 8, further comprising:
a plurality of circuits, each of the plurality of circuits comprising a plurality of segments,
wherein the check engine circuit comprises an enable register indicating a subset of the plurality of circuits that should be checked for errors.

12. The integrated circuit of claim 8, wherein the check value register stores first check values corresponding to other check values stored in the check value register and data in the mask register,
wherein the check engine circuit is configured to use the first check values to determine whether the other check values stored in the check value register and the data in the mask register have become corrupted.

13. The integrated circuit of claim 12, wherein the segment comprises a plurality of check value registers, wherein a first register of the plurality of check value registers stores the first check values and a second register of the plurality of check value registers stores check values only corresponding to the valid configuration data.

14. A method, comprising:
receiving check values from a local check value register in a segment, wherein the segment further comprises a plurality of configuration registers and a mask register;
identifying which of the plurality of configuration registers should be checked for errors based on a bit mask in the mask register; and
performing an integrity check on the identified configuration registers based on the check values.

15. The method of claim 14, wherein performing the integrity check comprises:
retrieving configuration data from the identified configuration registers;
generating check values from the configuration data; and
comparing the check values from the configuration data with the check values from the local check value register.

16. The method of claim 14, wherein the segment comprises a next segment register indicating a next segment that should be checked for errors once the segment has been checked, wherein the method comprises:
identifying a number of sequential segments to skip using the next segment register.

17. The method of claim 14, wherein the mask register comprises an identifier indicating whether the segment is a last segment.

18. The method of claim 14, wherein the integrity check is performed using a check engine circuit that is disposed on a same integrated circuit as the segment.

19. The method of claim 14, wherein the local check value register stores first check values corresponding to other check values stored in the local check value register and data in the mask register, the method comprises:
using the first check values to determine whether the other check values stored in the local check value register and the data in the mask register have become corrupted.

20. The method of claim 19, wherein the segment comprises a plurality of check value registers, wherein a first register of the plurality of check value registers stores the first check values and a second register of the plurality of check value registers stores check values only corresponding to configuration data stored in the identified configuration registers.

* * * * *